United States Patent

Poplawski

[11] Patent Number: 5,885,664
[45] Date of Patent: Mar. 23, 1999

[54] PROCESS FOR PROVIDING A PISTON TRAVEL INDICATOR FOR A RAILROAD CAR BRAKE ASSEMBLY

[75] Inventor: Edward Joseph Poplawski, Beaver Falls, Pa.

[73] Assignee: E.J.P. Machine, Inc., Monaca, Pa.

[21] Appl. No.: 909,562

[22] Filed: Aug. 12, 1997

Related U.S. Application Data

[63] Continuation-in-part of Ser. No. 825,928, Apr. 7, 1997, Pat. No. 5,817,375.

[51] Int. Cl.$^6$ .................................. B05D 1/06; B05D 3/02
[52] U.S. Cl. .......................... 427/475; 427/485; 427/486; 427/372.2
[58] Field of Search ....................... 116/208; 188/1.11 R, 188/1.11 W, 34; 427/485, 486, 195, 197, 372.2, 475

[56] References Cited

U.S. PATENT DOCUMENTS 3,056,380  10/1962  White .
3,637,054  1/1972  Billeter .................................. 188/195
4,069,974  1/1978  Zawacki ................................. 239/15
4,279,214  7/1981  Thorn .................................... 116/208
4,393,112  7/1983  Honjo et al. .......................... 428/207
4,989,537  2/1991  Hutchinson, Jr. et al. ............. 116/208
5,140,932  8/1992  Goldfein et al. ...................... 116/208
5,236,528  8/1993  Nakagawa ............................. 156/153

*Primary Examiner*—Michael Lusignan
*Assistant Examiner*—Fred J. Parker
*Attorney, Agent, or Firm*—Aileen Champion Addessi

[57] ABSTRACT

A process and apparatus for providing a piston travel indicator for a railroad brake includes coating the components of the brake assembly with a powder. The powder coating may include an epoxy, a polyester or combinations thereof. After the selected components of the railroad car brake assembly are sprayed with the powder, the components are heated in an oven for curing the powder to form a coating on the components. The coating may be applied in dual or multiple colors to the railroad car brake components. A piston travel indicator on the hollow rod is provided by coating the hollow rod of the piston with more than one color at specific intervals for enabling a person to visually observe the colors for determining the travel of the hollow rod and indicating if the brake is functioning properly.

7 Claims, 4 Drawing Sheets

PROCESS FOR PROVIDING A PISTON TRAVEL INDICATOR FOR A RAILROAD CAR BRAKE ASSEMBLY

This is a Continuation-in-part of application Ser. No. 08/825,928, filed Apr. 7, 1997, now U.S. Pat. No. 5,817,375.

BACKGROUND OF THE INVENTION

The invention relates to powder coating and, more particularly, to the coating of railroad car brake assembly components.

Powder coating is used in various industries as a finishing technology for producing a high quality and durable finish while maximizing production, reducing costs, improving efficiency, and complying with environmental regulations. Powder coating is currently used on products such as appliances, building materials, electrical components, and furniture.

A railroad car has brake assemblies for controlling the speed of the railroad car along the railroad tracks. Each brake assembly of the railroad car includes numerous components which cooperatively work together, and are formed of various materials, such as cast iron, cast steel, aluminum and spring steel. After extended periods of use, such as the extensive miles traveled by a railroad car, the components of the railroad car brake tend to show wear, corrosion, abrasion or the like, requiring repair or replacement of some of the components of the railroad car brake or the entire railroad car brake assembly.

Currently, the piston tube is anodized. However, when the piston tube is subjected to certain conditions, such as salt or ultraviolet light, the anodized coating tends to break down.

Additionally, to determine how far the hollow rod of the piston extends from the brake cylinder, a person must crawl under the railroad car and measure the distance. The distance that the hollow rod extends from the cylinder is used for determining if the brake is working properly.

Therefore, what is needed is a method for improving the performance and extending the life of the railroad car brake assembly which involves coating components of the railroad car brake assembly with a powder coating.

SUMMARY OF THE INVENTION

A process and apparatus for providing a piston travel indicator for a railroad car brake assembly includes powder coating a first portion of a hollow rod of a piston of the railroad car brake assembly with a first color, powder coating a second portion of the hollow rod with a second color, and powder coating a third portion of the hollow rod with one of the first color and a third color for providing a piston travel indicator on the hollow rod enabling a person to visually observe the colors on the hollow rod which extends from a cylinder for determining if the railroad car brake assembly is functioning properly.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings, wherein:

DESCRIPTION OF THE PREFERRED EMBODIMENT

The invention described herein provides an apparatus and a method for improving the performance and extending the life of railroad car brake assemblies.

The term railroad car is defined as including railcars, locomotives, or the like. The brake assembly of the railroad car may be body mounted, truck mounted, or any other type of brake.

To improve the performance of the railroad car brake, at least one or several of the components of the brake assembly is coated with a powder coating. By coating the components of the railroad car brake assembly, the railroad car brake has improved wear qualities. The powder coating improves the performance of the railroad car brake by maintaining slippage due to less friction and by resisting corrosion, abrasion, heat and impact.

The coating which is applied to the components of the railroad car brake assembly is a powder which includes finely ground particles of pigment and resin. The powder may be a polyester, an epoxy, combinations thereof, or the like. Additionally, the powder may include anti-gasing agents, curing agents, catalysts, fillers, colorants, flow-control agents, ultraviolet light resistant agents, or any other suitable component.

Preferably, the powder used is a low-curing temperature hybrid of the thermoplastic powder coating and provides a thin-layer coating. The powder melts when subjected to heat and solidifies when cooled. The powder undergoes an irreversible chemical change during the curing process and does not soften back to the liquid phase when reheated. As an example, the thickness of the coating may be approximately 2 to 4 mils.

To apply the powder coating, the powder is electrostatically charged and sprayed onto a part to be coated. The coating process can be preformed manually or automatically. The components or parts of the railroad car brake assembly that are coated are electrically grounded so that the charged powder particles projected at the parts adhere to the parts and are held there until melted and fused into a smooth coating in a curing oven. As an example, the components can be cured at approximately 400° for approximately 30 minutes to fusion bond the material.

Prior to the application of the powder coating, the components to be coated are cleaned and inspected. The cleaning may include chemical cleaning, blast cleaning with abrasives, or the like for removing oil, grease, tar, rust, or other contaminants. The components are inspected for adequate cleaning and for surface imperfections, such as burrs, slivers, gouges, or the like which should be repaired prior to coating for preventing the formation of holidays in the coating. The components can be cooled after the curing process with air or water spray to a temperature below 200° Fahrenheit (93° Celsius) for handling of the parts.

Figure 1:
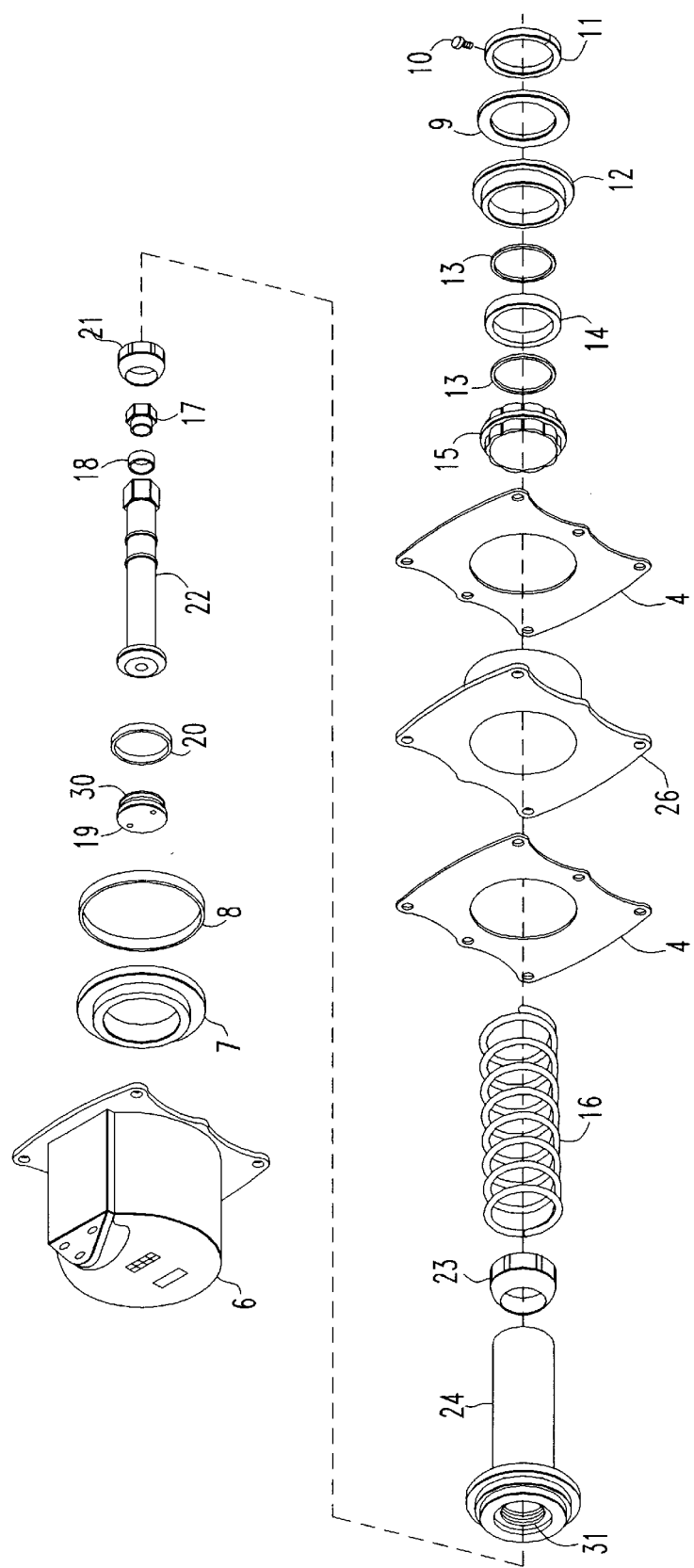
FIG. 1 is an exploded view of a railroad car brake assembly.
Figure 2:
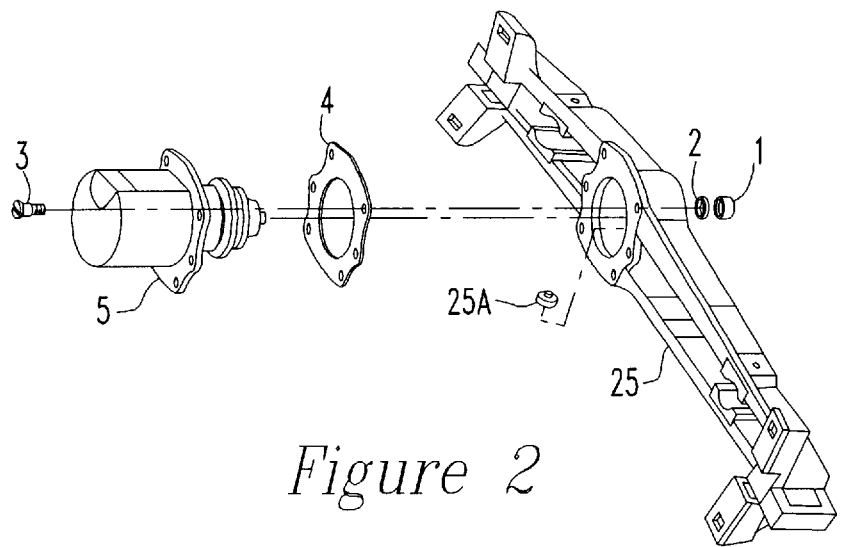
FIG. 2 is a partial exploded view of the railroad car brake assembly of FIG. 1.

Referring to FIGS. 1 and 2, a railroad car brake assembly of a railroad car includes the following components: a nut 1, a washer 2, a bolt 3, a gasket 4, a cylinder with piston and push rod end assembly 5, a cylinder body 6, a packing cup 7, a piston head ring guide 8, a hollow rod guide gasket 9, a self-locking set screw 10, a push rod holder 11, a hollow rod guide 12, an 0-ring 13, a hollow rod packing seal 14, a ring seat 15, a release spring 16, a locking nut 17, a push rod seal 18, a lock plug 19, a lock ring 20, an anti-rattler ring 21, a push rod end 22, a push rod end seal 23, a piston body 24, a beam 25, a strainer 25A, and a spring seat stop 26. FIGS. 1 and 2 are illustrative of a brake assembly manufactured by WABCO and may be made in a 7½ inch and an 8½ inch size, which refers to the diameter of the piston.

The lock plug 19 has threads 30 and the piston body 24 has threads 31. Preferably, the threads 30 of the lock plug 19 are masked, such as with tape or the like, so that the threads are not coated. Other sections of the components of the brake may also be masked for coating only specific areas of the brake assembly components as desired.

The nut 1 engages the bolt 3 to hold the cylinder 6 with the piston and push rod end assembly 5, interspaced with the gasket 4, against the beam 25. The locking nut 17 retains one end of the rod 22 and engages the ring 21, and the lock ring 20 engages an opposite end of the rod 22. The packing cup 7 is disposed within the cylinder 6. The moving parts, such as the push rod 22 and the piston 24 within the cylinder 6, the plug 19 and the spring 16 interact together and cooperate among one another to control the speed of the railroad car. Various other components act as seals or gaskets to absorb impact, restrict the flow of fluid or other similar function, such as the gasket 9, the O-ring 13, the seals 14, 18, and 23. The guides 8 and 12, the seat 15, the stop 26 and the holder 11 control movement of the components.

For the various embodiments of this invention, the same reference characters will be used to designate like parts. In addition, like functions and like interactions of the parts among the various embodiments of this invention will not be repeated for each embodiment.

Figure 4:
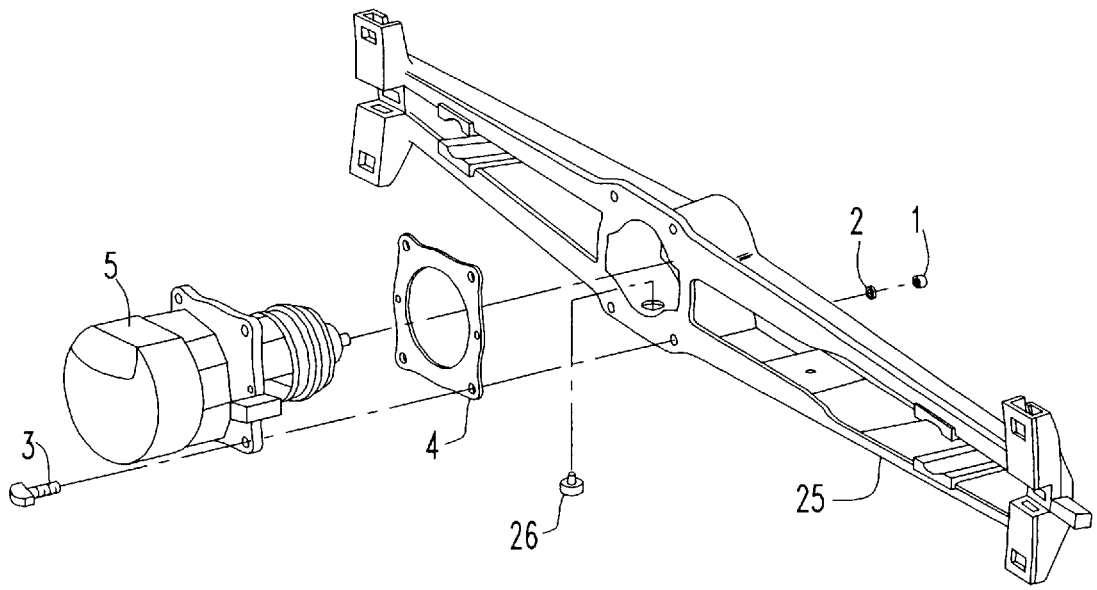
FIG. 4 is a partial exploded view of the railroad car brake assembly of FIG. 3.
Figure 3:
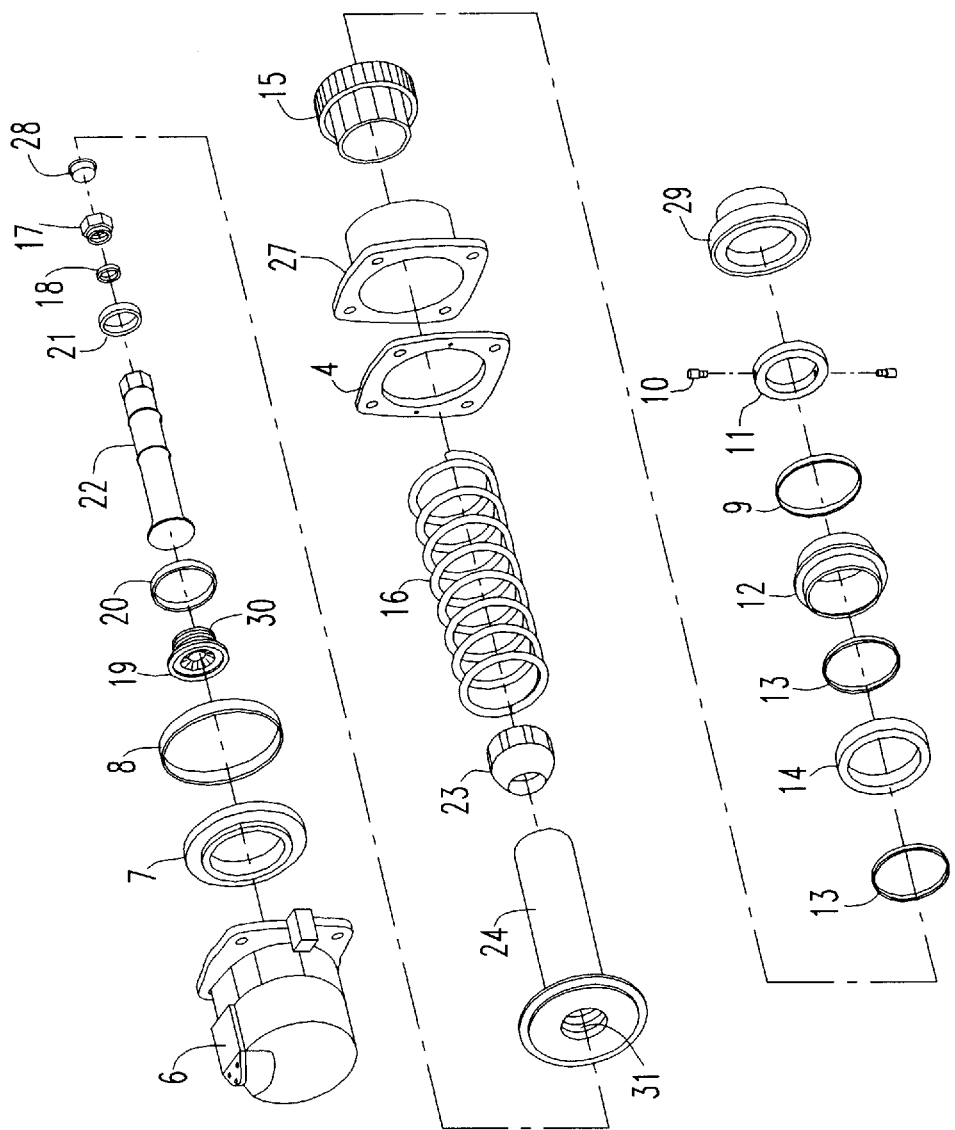
FIG. 3 is an exploded view of an alternative embodiment of the railroad car brake assembly.

Referring to FIGS. 3 and 4 and using the same reference characters to define like parts, an alternative embodiment of the railroad car brake assembly as illustrated in FIGS. 1 and 2 may be a railroad car brake assembly manufactured by New York Air Brake (NYAB) having like parts as the WABCO brake assembly and additionally having a thread protector 28 and a shipping cover 29. Like WABCO brake illustrated in FIGS. 1 and 2. New York Air Brake also manufactures an cylinder assembly in a 7½ inch and an 8½ inch size.

The following tables illustrate examples of railroad car brake assembly components which may be powder coated:

TABLE 1

7½ inch WABCO Brake Assembly Components

| Reference No. | Component Name | Part No. | Drawing No. |
|---|---|---|---|
| 6 | Cylinder Body | 566009 | 22037350 |
| 16 | Release Spring | 562963 | 22808701 |
| 19 | Lock Plug | 567398 | 22579302 |
| 22 | Push Rod End | 562950 | |
| 24 | Piston Body | 567401 | |

TABLE 2

8½ inch WABCO Brake Assembly Components

| Reference No. | Component Name | Part No. | Drawing No. |
|---|---|---|---|
| 6 | Cylinder Body | 566251 | 22037368 |
| 16 | Release Spring | 562963 | 22808701 |
| 19 | Lock Plug | 567398 | 22579302 |
| 22 | Push Rod End | 562960 | |
| 24 | Piston Body | 567402 | 22043713 |

TABLE 3

7½ inch NYAB Brake Assembly Components

| Reference No. | Component Name | Part No. | Drawing No. |
|---|---|---|---|
| 6 | Cylinder Body | 566009 | TB-176 |
| 16 | Release Spring | 562963 | TB-138 |
| 19 | Lock Plug | 760742 | 760742 |
| 22 | Push Rod End | 562960 | TB-154 |
| 24 | Piston Body | 567401 | TB-177-C |

TABLE 4

8½ inch NYAB Brake Assembly Components

| Reference No. | Component Name | Part No. | Drawing No. |
|---|---|---|---|
| 6 | Cylinder Body | 566251 | TB-191 |
| 16 | Release Spring | 562963 | TB-138 |
| 19 | Lock Plug | 760742 | 760742 |
| 22 | Push Rod End | 562960 | TB-154 |
| 24 | Piston Body | 567402 | TB-190-C |

Additionally, other components of the railroad car brake assembly may also be powder coated for improving the performance and extending the life of the brake. Also, the powder coating process may be used on any type and size of railroad car brake assembly or other manufacturer of brake assemblies, such as Triax.

Typically, the cylinder body is formed of cast iron, the lock plug is formed of cast steel, the push rod end is formed of cast steel, the piston body is formed of aluminum, and the release spring is formed of spring steel.

The powder coating may be applied in dual or multi colors to the railroad car brake components. By providing more than one color on various components or on one component of the railroad car brake, various indicators can be provided by using powder coating. Preferably, the powder coating is applied to a component of the railroad car brake assembly that measures piston travel, such as a hollow rod 32 of the piston, an adjusting rod, a push rod, or the like, for providing a piston travel indicator.

Figure 5:
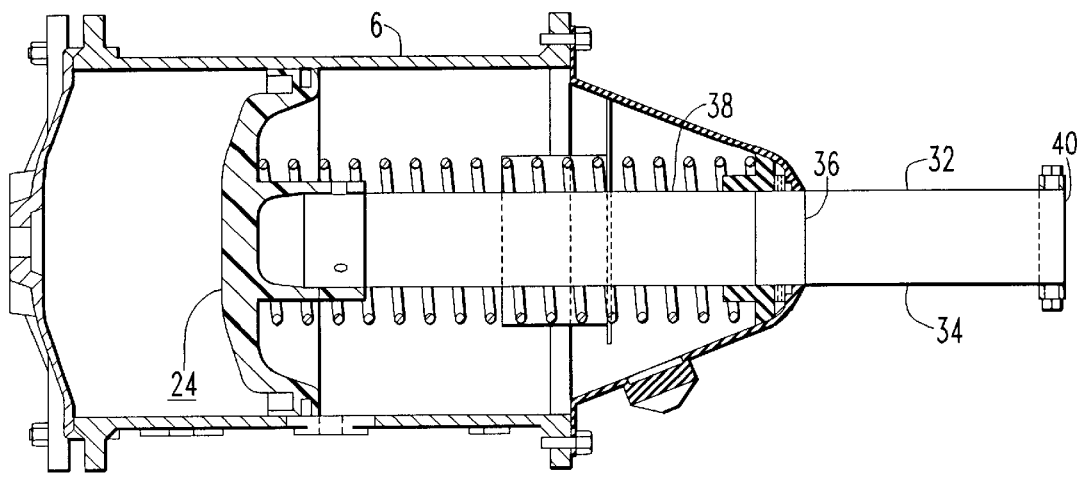
FIG. 5 is a cross-sectional view of a brake assembly illustrating a multi-colored coated piston.
Figure 6:
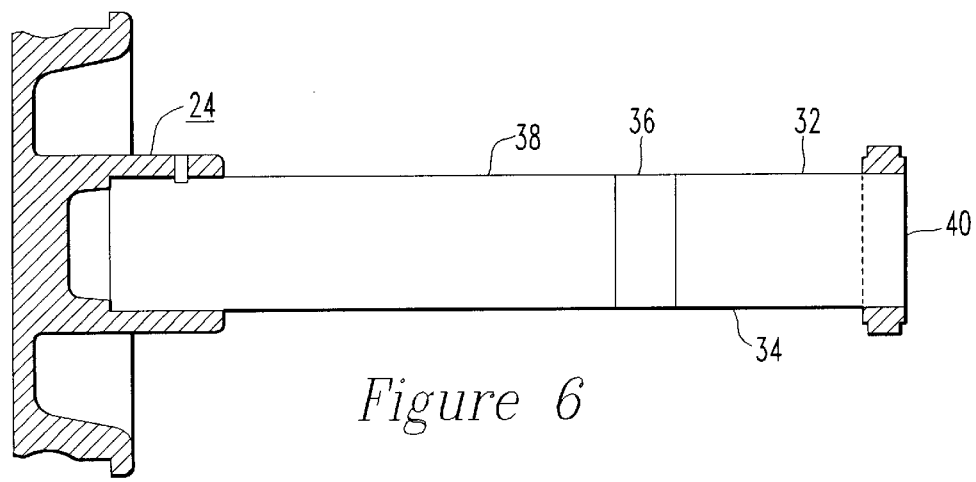
FIG. 6 is a cross-sectional view of an alternative embodiment of the piston.

For example and referring to FIGS. 5 and 6, the piston 24 includes a hollow rod 32, which may be dual or multi-color coated for providing a piston travel indicator on the hollow rod. The piston travel indicator on the hollow rod includes the hollow rod 32 having a first portion 34, which is coated with a first color, a second portion 36, which is coated with a second color, and a third portion 38, which may be coated with the first color or a third color.

The hollow rod 32 of the piston 24 moves in and out of the cylinder 6. To determine if the railroad car brake assembly is working properly, a person may look at the piston travel indicator on the hollow rod of the brake assembly and visually determine how far the hollow rod comes out of the brake cylinder. As one example, the first color of the first portion 34 may extend approximately 7 inches from an end 40 of the piston 24 toward the second portion 36 and the second color of the second portion 36 may extend approximately 2 inches between the first and third portions 34 and 38 of the hollow rod 32. If a person sees the first color of the first portion 34 or sees the first and second colors of the first and second portions 34 and 36 only, then the brake assembly is determined to be working properly. If a person sees the colors of the first, second and third portions 34, 36 and 38, then the brake assembly is determined to not be working properly. By providing color coding at specific intervals and for specific distances enables a person to visually observe the colors for determining the travel of the hollow rod and for indicating if the brake is functioning properly.

Air brake inspection guidelines say that piston travel of body mounted brake cylinders which is less than 7 inches or more than 9 inches must be adjusted to nominally 7 inches. The air brake inspection guideline says that maximum piston travel of truck mounted brake cylinders must not exceed 6 inches. Minimum piston travel must be sufficient to provide proper brake shoe clearance when brakes are released. Additionally, on cars equipped with other than a standard single capacity brake, the piston travel must be adjusted as indicated on a badge plate or stenciling near the brake cylinder on a car. By coating the hollow rod 32 with more than one color, these adjustments can easily be made.

An advantage of the use of the powder coating is that the coated railroad car brake assemblies have improved performance enabling the brakes to be used longer and for extended mileage between replacement or repair, as compared to brakes that have not been coated. The powder coated brake assemblies can be serviced more efficiently, providing a time-saving advantage over brake assemblies which are not powder coated.

The powder coating increases the performance of the brake by increasing the hardness of the railroad car brake assemblies by maintaining slippage among the components of the brake due to reduced friction, and by reducing corrosion and abrasion. The powder coated railroad car brake assemblies also have increased performance due to a reduction in wear and increased resistance to impact.

Several of the components of the railroad brake assembly need to be replaced more often than other components of the brake due to corrosion, wear, etc. By coating these components, the life of the brake can be increased.

The piston travel indicator on the hollow rod provides an indicator for telling how far the hollow rod comes out of the brake cylinder without requiring a person to crawl under the train and measure the hollow rod. Additionally, human error in measuring the distance that the rod extends from the cylinder is eliminated.

Thus there has been shown and described a novel process for improving the performance of railroad car brake assembly components which fulfills all the objects and advantages sought therefor. Many changes, modifications, variations and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

I claim:

1. A process for providing a piston travel indicator for a railroad car brake assembly, said railroad car brake assembly including a piston hollow rod, comprising the steps of powder coating by electrostatic spraying said piston hollow rod with at least two colors by applying each of said at least two colors at a specific location for a predetermined distance for providing a piston travel indicator on said piston hollow rod enabling a person to visually observe said at least two colors on said piston hollow rod for determining if said railroad car brake assembly is functioning properly, and curing said powder coated piston hollow rod.

2. The process according to claim 1, wherein said powder coating step further comprises:

powder coating by electrostatic spraying a first portion of said piston hollow rod of said railroad car brake assembly with a first color for providing an indication of travel of said piston which is unacceptable;

powder coating by electrostatic spraying a second portion of said piston hollow rod with a second color for providing an indication of travel of said piston within an acceptable range; and powder coating by electrostatic spraying a third portion of said piston hollow rod with one of said first color and a third color for providing an indication of travel of said piston which is unacceptable.

3. The process according to claim 1, wherein said powder coating step further comprises:

powder coating by electrostatic spraying a first portion of said piston hollow rod of said railroad car brake assembly with a first color for providing an indication of normal travel of said piston; and powder coating by electrostatic spraying a second portion of said piston hollow rod with a second color for providing an indication of travel of said piston which is unacceptable.

4. A process for providing a piston travel indicator for a railroad car brake assembly, said railroad car brake assembly including a piston hollow rod, comprising the steps of powder coating by electrostatic spraying of said piston hollow rod with a powder including a colorant by electrostatically applying said powder on at least two portions of said piston hollow rod for a predetermined distance, said at least two portions of said piston hollow rod in spaced apart relation, for providing a piston travel indicator on said piston hollow rod enabling a person to visually observe said at least two portions on said piston hollow rod for determining if said railroad car brake assembly is functioning properly, and curing said powder coated piston hollow rod.

5. The process according to claim 4, wherein said step of electrostatically spraying said powder coating further includes adding at least two colorants into said powder for applying a first colored powder coating onto one of said portions of said piston hollow rod and for applying a second colored powder coating onto the other of said portions of said piston hollow rod.

6. The process according to claim 4, further comprising powder coating by electrostatic spraying a portion of said piston hollow rod positioned between said at two portions of said piston hollow rod with a powder not including a colorant.

7. The process according to claim 4, wherein said powder coating step further comprises:

powder coating by electrostatic spraying a first portion of said piston hollow rod of said railroad car brake assembly with a powder including a first colorant for providing an indication of travel of said piston which is unacceptable;

powder coating by electrostatic spraying a second portion of said piston hollow rod with a powder including a second colorant for providing an indication of travel of said piston within an acceptable range; and powder coating by electrosatic spraying a third portion of said piston hollow rod with a powder including one of said first colorant and a third colorant for providing an indication of travel of said piston which is unacceptable.

* * * * *